(12) United States Patent
Gauthier et al.

(10) Patent No.: US 7,199,551 B2
(45) Date of Patent: Apr. 3, 2007

(54) METHOD AND SYSTEM FOR CONTROLLABLY TRANSFERRING ENERGY FROM A HIGH VOLTAGE BUS TO A LOW VOLTAGE BUS IN A HYBRID ELECTRIC VEHICLE

(75) Inventors: Greg E. Gauthier, Dearborn, MI (US); Joseph W. Anthony, Lytle, TX (US); Renuka V. Gokhale, Farmington Hills, MI (US); Christopher A. Ochocinski, Canton, MI (US); David J. Mack, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 10/605,388

(22) Filed: Sep. 26, 2003

(65) Prior Publication Data

US 2005/0068003 A1    Mar. 31, 2005

(51) Int. Cl.
*H01M 10/44*  (2006.01)
*H01M 10/46*  (2006.01)

(52) U.S. Cl. .................................................. 320/104

(58) Field of Classification Search ................. 320/103, 320/104, 118, 127, 140
See application file for complete search history.

(56) References Cited

U.S. PATENT DOCUMENTS

| | | | |
|---|---|---|---|
| 5,717,310 A | 2/1998 | Sakai et al. | |
| 5,808,448 A | 9/1998 | Naito | |
| 5,838,137 A | 11/1998 | Kim | |
| 5,869,950 A | 2/1999 | Hoffman, Jr. et al. | |
| 5,883,496 A | 3/1999 | Esaki et al. | |
| 5,932,990 A | 8/1999 | Kaneko | |
| 5,969,624 A | 10/1999 | Sakai et al. | |
| 5,977,652 A | 11/1999 | Frey et al. | |
| 5,982,143 A | 11/1999 | Stuart | |
| 6,271,645 B1 | 8/2001 | Schneider et al. | |
| 6,275,004 B1 | 8/2001 | Tamai et al. | |
| 6,313,546 B1 * | 11/2001 | Nishimura et al. | 320/104 |
| 6,326,768 B2 | 12/2001 | Nagai et al. | |
| 6,388,421 B2 | 5/2002 | Abe | |
| 6,404,151 B1 | 6/2002 | Bader | |
| 2003/0029654 A1 * | 2/2003 | Shimane et al. | 180/65.4 |

* cited by examiner

*Primary Examiner*—Edward H. Tso
(74) *Attorney, Agent, or Firm*—David B. Kelley; Brooks & Kushman

(57) ABSTRACT

A method and system for controllably transferring energy from a high voltage bus to a low voltage bus in a hybrid electric vehicle. A vehicle system controller controls a DC/DC converter coupled between the high voltage bus and the low voltage bus to control the transfer of energy therebetween.

22 Claims, 2 Drawing Sheets

METHOD AND SYSTEM FOR CONTROLLABLY TRANSFERRING ENERGY FROM A HIGH VOLTAGE BUS TO A LOW VOLTAGE BUS IN A HYBRID ELECTRIC VEHICLE

BACKGROUND OF INVENTION

1. Field of the Invention

The present invention relates hybrid electric vehicles having a high voltage bus and a low voltage bus, and in particular, to transferring energy from the high voltage bus to the low voltage bus.

2. Background Art

Many hybrid electric vehicles, such as series, parallel, and parallel-series hybrids, typically include a high voltage bus and a low voltage bus. Typically, the high voltage bus transfers energy between components used to drive the vehicle and the low voltage bus transfers energy to accessory loads.

The high voltage bus can be electrically coupled to the low voltage bus by a DC/DC converter, allowing energy to be transferred between the buses. Because the high voltage bus maintains a high voltage, it is typically discharged when the vehicle is not in operation. In doing so, a battery or other high voltage energy storage device coupled to the high voltage bus is isolated from the rest of high voltage bus.

Commonly, the isolation is achieved by opening contactors used to electrically couple the high voltage energy storage device to the rest of the high voltage bus. The open contactors must then be closed to start the vehicle. Prior to closing the opened contactors, energy is transferred from the high voltage energy storage device to the high voltage bus for precharging the high voltage bus.

The precharging prevents an instantaneous short from occurring when the contactors eventually close. The precharging ends when the high voltage bus is sufficiently charged and the contractors close.

After precharging, but before the entire powertrain is enabled, the system waits in a state where the high voltage bus is enabled but a primary energy source, typically an internal combustion engine or a fuel cell system, is temporarily disabled. This is referred to as "prestart."

During such prestart, experimental testing indicates some degradation can occur to a low voltage battery coupled to the low voltage bus. In particular, the degradation can occur when the accessory loads powered by the low voltage bus are operated during extended periods of prestart, such as when the ignition key is in the run position and the lights or radio are on. Accordingly, there exists a need to limit such degradation to the low voltage battery.

SUMMARY OF INVENTION

The present invention meets the need identified above with a method and system for controllably transferring energy from a high voltage bus to a low voltage bus during prestart. In this manner, a low voltage battery coupled to the low voltage bus can receive sufficient energy during prestart to limit degradation.

One aspect of the present invention relates to a method for operating a hybrid electric vehicle to limit degradation of the low voltage battery. The method generally relates to controllably transferring energy to the low voltage battery using a DC/DC converter.

In one embodiment of the present invention, the DC/DC converter is coupled between the high and low voltage buses, allowing energy to be controllably transferred between the buses. The method includes controlling the DC/DC convert based on energy available from a high voltage battery coupled to the high voltage bus.

One aspect of the present invention relates to monitoring the high voltage battery energy level and controlling the DC/DC converter to transfer energy to the low voltage bus. Preferably, energy is only transferred to the low voltage bus if the high voltage battery energy is sufficient for powering an electric starter. This is done to ensure that enough energy is available for the electric starter to start the primary power source.

One aspect of the present invention relates to a hybrid vehicle system. The hybrid vehicle system includes a vehicle having a high voltage bus and a low voltage bus. An internal combustion engine (primary power source) and a high voltage battery (secondary power source) provide hybrid operation of the vehicle.

The system further includes a DC/DC converter and a vehicle system controller. Preferably the DC/DC converter is coupled between the high voltage bus and the low voltage bus. The vehicle system controller includes instructions for controllably transferring energy from the high voltage bus to the low voltage bus during prestart by controlling energy flow through the DC/DC converter.

DETAILED DESCRIPTION

The invention described herein is a system and corresponding method for operating a hybrid electric vehicle during prestart for example, after an ignition key is turned to a run position during which a primary power source is temporarily deactivated. The method described herein is applicable generally to any hybrid vehicle system, and is not limited to a specific construction or configuration of the vehicle or its powertrain.

Figure 1:
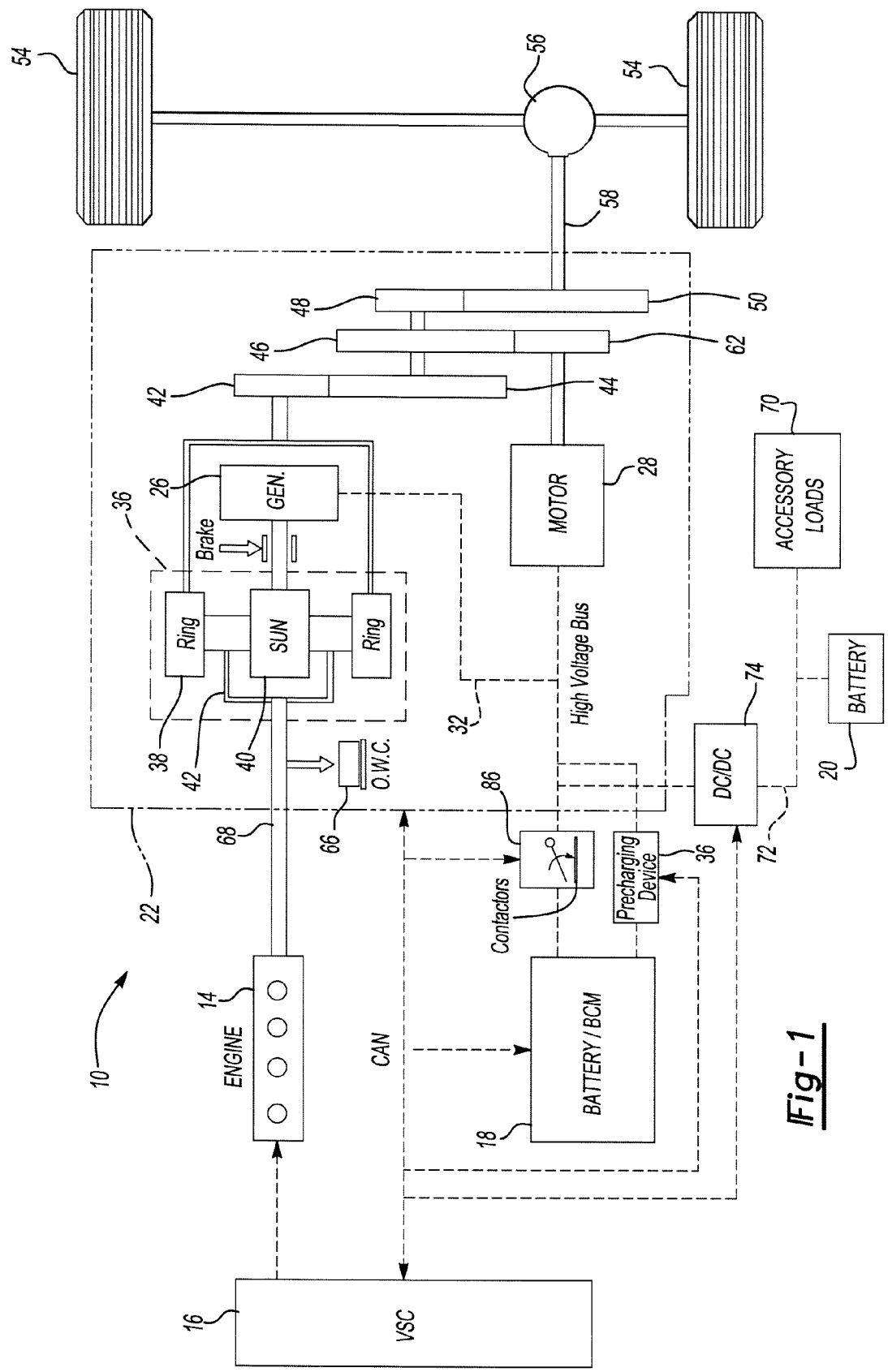
FIG. 1 illustrates an example of a hybrid electric vehicle arrangement for transferring energy between a high voltage bus and a low voltage bus, in accordance with the present invention.

FIG. 1 shows generally a hybrid vehicle system to which the present invention may be applicable, commonly referred to as a parallel-series hybrid vehicle (PSHEV) system 10. The present invention, however, also relates to other hybrid vehicles (HEVs), including series hybrid electric vehicles (SHEV), parallel hybrid electric vehicles (PHEV), and fuel cell hybrid vehicles (FCHEV).

The system 10 includes a gasoline-fueled internal combustion engine (ICE) 14, a vehicle system controller (VSC) 16, a high voltage battery 18, and a low voltage battery 20.

The internal combustion engine 14 and high voltage battery 18 are coupled to the vehicle driveline through an electronic power transmission unit 22 having a first motor/generator 26 and a second motor/generator 28. The first motor/generator 26 functions primarily as a generator and the second motor/generator 28 functions primarily as a motor.

The high voltage battery 18 series primarily as an energy storage device to store electrical energy produced by the first motor/generator 26. A high voltage bus 32 couples the first and second motor/generators to the high voltage battery 18. A precharging device 36, controllable by the vehicle system controller 16, provides energy from the battery 18 to the high voltage bus 32 for precharging.

The internal combustion engine 14 is generally referred to as "the primary power source," and the combination of the high voltage battery 18, motor/generator 26 and motor/generator 28 is collectively referred to as "the secondary power source." It is understood, however, that the primary and secondary sources can be interchanged, and that the invention is not intended to be limited to specific types of vehicular power sources.

The primary power source, for example, can be any internal combustion engine, including but not limited to gasoline, diesel, hydrogen, methanol, natural gas, ethanol or other gas or liquid-fueled internal combustion engine. Alternatively, the primary power source can be a fuel cell engine, such as a hydrogen-powered fuel cell engine.

The secondary power source likewise is not limited to a battery and corresponding electrical machines, but may also include ultracapacitors, linear generators and other electromechanical or hydraulic devices for generating torque.

The power transmission unit 22 includes a planetary gearset 36, which includes a ring gear 38, a sun gear 40 and a planetary carrier assembly 42. The ring gear 38 couples motor/generator to the vehicle drivetrain via step ratio gears/meshing gear elements 42, 44, 46, 48 and 50.

Sun gear 40 and planetary carrier assembly 42 likewise couple the internal combustion engine 14 and motor/generator 26, respectively, to the vehicle drivetrain (shown as vehicle traction wheels 54, and differential and axle mechanism 56) via a torque output shaft 58 of the power transmission unit 22.

Gears 44, 46, and 48 are mounted on a countershaft, the gear 46 engaging a motor-driven gear 62. Electric motor 28 drives gear 62, which acts as a torque input for the countershaft gearing.

Via the VSC 16, the HEV system 10 can be operated in a number of different power "modes" utilizing one or more of the internal combustion engine 14, motor/generator 26 and motor/generator 28. Some of these modes, described generally as "parallel," "split" and "electric," are described for example in U.S. patent application Ser. No. 10/248,883, which is owned by the present assignee and hereby incorporated herein by reference in its entirety.

One of these modes, the "electric vehicle" (EV) or "electric drive mode," is established when the internal combustion engine 14 is shut off and a one-way clutch 66 engaged for braking torque input shaft 68 and the carrier assembly 42. This leaves the vehicle in EV mode wherein tractive force is delivered only by an electric propulsion system comprised of the high voltage battery 18 and one or both of the motor/generators 26 and motor/generator 28.

The foregoing, generally, describes the means for driving the vehicle using one or both of the engine 14 (primary power source) and the high voltage battery 18, the first and second motor/generator 26, 28 (secondary power source). In addition, the system 10 can also be used to power accessory loads 70 such as, a radio, CD player, GPS system, lighting, and others, as one of ordinary skill in the art will appreciate.

The accessory loads 70 are preferably powered via energy delivered over low voltage bus 72. The energy to power the accessory loads 70, in accordance with the present invention, can originate from the low voltage battery 20 or the high voltage bus 32.

A DC/DC converter 74 is provided to control the transfer of energy to the low voltage bus 72 from the high voltage bus 32. In this manner, energy from the high voltage battery 18, or energy developed during regenerative braking and delivered to the high voltage bus 32, can be transferred though the DC/DC converter 74 to the low voltage bus 72.

The DC/DC converter 74 is controllable by the vehicle system controller 16. In general, the vehicle system controller 16 can monitor various system 10 sensors and communicate a control signal to the DC/DC converter 74. In response to the control signal, the DC/DC converter 74 controls the transfer of electrical energy between the high voltage bus 32 and the low voltage bus 72.

Figure 2:
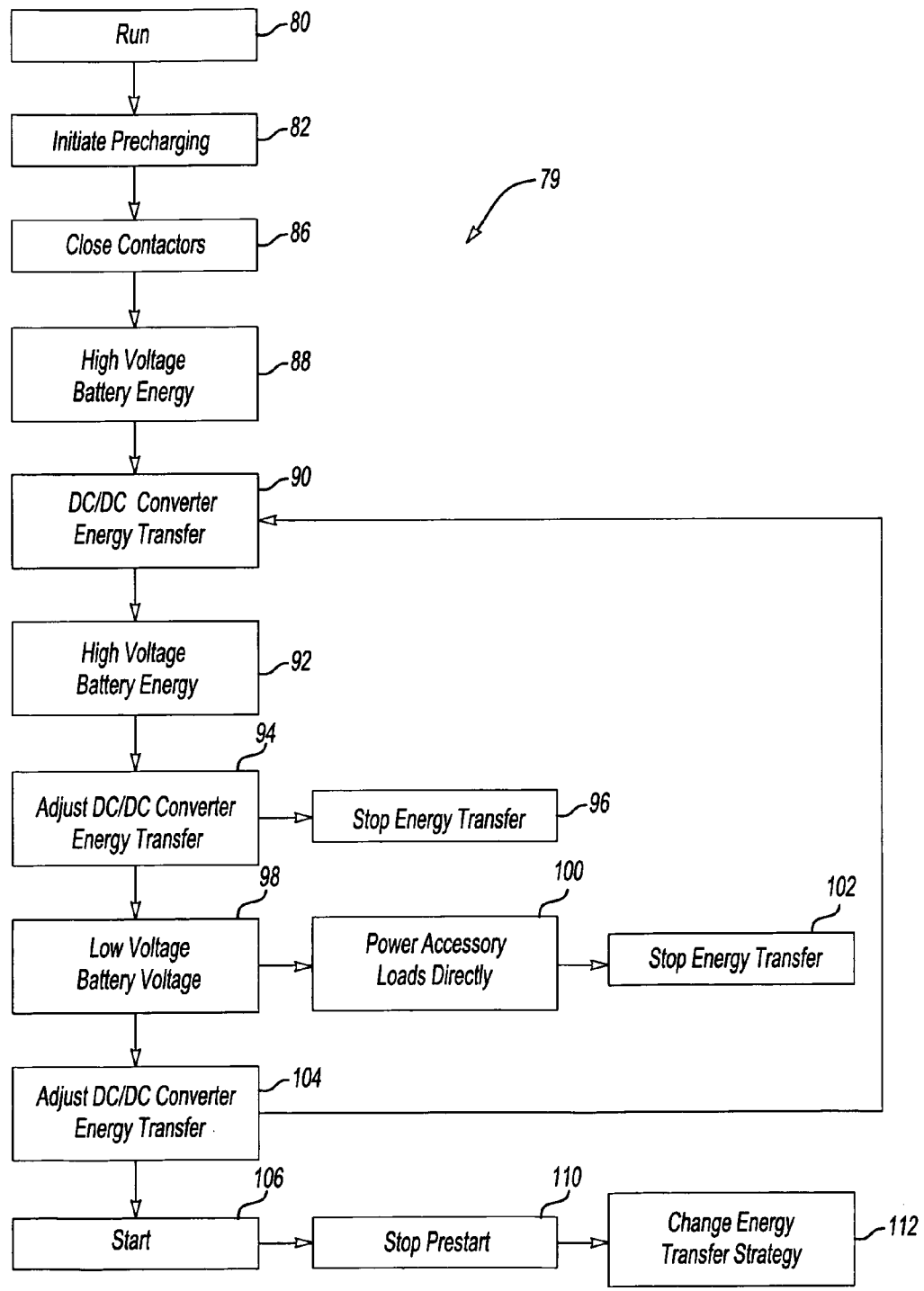
FIG. 2 illustrates an example of a control strategy flowchart representing a method for implementation by an electronic control module to control the transfer energy to the low voltage bus, in accordance with the present invention.

FIG. 2 illustrates a flowchart 78 representing a method for implementation by the electronic control module 16 in accordance with the present invention to controllably transfer energy to the low voltage bus 72.

A block 80 relates to determining an ignition key turned to a run position. The run position is a key position which activates the vehicle electrical system, but not the engine. Generally, the accessory loads 70 can be used when the ignition key is turned to the run position.

A block 82 relates to initiating precharging of the high voltage bus 32 response to block 80 by transferring limited energy to the high voltage bus 32 prior to closing contactors 84. Typically, this is done with a resistive element, not shown, bypassing the contactors 84. The precharging prevents an instantaneous short from occurring in the high voltage bus when the contactors eventually close.

A block 86 relates to closing contactors 84. The contactors 84 are closed to couple the high voltage battery 18 to the high voltage bus 32. The closed contactors 86 signify the end of precharging. After precharging, but before the entire powertrain is enabled, the system waits in a state in which the high voltage bus is enabled but a primary energy source, typically an internal combustion engine or a fuel cell, is temporarily disabled. This is referred to as a prestart.

During such prestart, experimental testing indicates some degradation can occur to the low voltage battery 20 coupled to the low voltage bus 72, especially when accessories powered by the low voltage bus 72 are operated during extended periods of prestart, such as when the ignition key is in the run position and the lights or radio are on.

As described below, the present invention limits such degradation by transferring energy to the low voltage bus 72 during prestart. In this manner, the battery 20, preferably, is prevented from over discharging. Because the over discharging is limited, a smaller battery can be used to save cost, or the battery could be replaced with an ultracapacitor or other energy storage device. The accessory loads can be operational for extended periods during prestart.

In this manner, energy from the high voltage battery 18 can be used to electrically start the generator/motor 26 and to provide torque for driving the vehicle, if desired. The use of the generator/motor 26 to crank the engine 14 could be performed by another electric starter, especially if a fuel cell is used instead of engine 14.

A block 88 relates to determining available energy from the high voltage battery 18. The available energy controls how much energy can be transferred to the low voltage bus 72 through the DC/DC converter 74. Preferably, the battery state of charge or the battery discharge power limit are determined. Based on one or more of these energy values, the vehicle system control 18 can determine how much energy can be transferred to the low voltage bus 72.

Preferably, the high voltage battery 18 always maintains sufficient energy for powering the generator/motor 26 so that the engine 14 can be cranked. As such, the transfer of energy to the low voltage bus 72 is correspondingly limited, as the energy transferred to the low voltage bus 72 during prestart drains the high voltage battery 18.

The amount of energy required to power the generator/motor 26 (electric starter) can vary depending on the generator/motor. In addition, the amount of energy required can also vary if the electric starter is another type of starting device or a fuel cell starter, as one of ordinary skill in the art will appreciate.

A block 90 relates to controlling the DC/DC converter 74 to transfer energy from the high voltage bus to the low voltage bus. This is done by the vehicle system controller 16, or other controller, as one of ordinary skill in the art will appreciate.

A block 92 relates to checking the energy available from the available battery energy determined in the block 92. A block 94 relates to adjusting the transfer of energy to the low voltage bus 72 based on the available energy determined in block 92. Preferably, the high voltage battery 18 is continuously monitored so sufficient energy is available for the electric starter.

A block 96 stops further transfer of energy to the low voltage bus 72 if block 94 determines that the available high voltage battery energy is insufficient to keep transferring energy to the low voltage bus 72. This can be determined based on the energy required for the electric starter or other energy requirements for the high voltage system.

A block 98 relates to checking the low voltage battery 20. Preferably, the low voltage battery 20 is checked to determine if charging is needed. This can include determining the charge of the low voltage battery 20, as well as the rate at which the accessory loads 70 are consuming energy.

A block 100 relates to powering the necessary loads 70 directly from the energy transferred through the DC/DC converter. This is preferably done once the low voltage battery is sufficiently charged by controlling the DC/DC converter to a voltage higher than the low voltage battery 20.

A block 102 stops further transfer of energy to the low voltage bus 72 if the low voltage battery is sufficiently charged and the accessory loads 70 are sufficiently powered.

A block 104 makes adjustments to the DC/DC converter 74 based on the charge of the low voltage battery 20 and the energy usage of the accessory loads 70. The adjustment can include increasing or decreasing the energy level and the rates of energy transfer.

A block 106 relates to determining whether the ignition key has been turned to the start position. In the start position, the primary drive source is now activated and the motor/generator 26 (electric starter) begins cranking. If the key is not in the start position, steps 90 through 104 are continuously repeated to maximize utilization of the energy available from the high voltage battery.

A block 110 relates to ending the prestart energy transfer and a block 112 relates to changing the energy transfer control strategy once the key is turned to the start position. This control strategy can still involve controlling the DC/DC convert and the transfer of energy to the low voltage bus.

As described above, the present invention provides a method and system for controllably transferring energy from a high voltage bus to a low voltage bus during prestart. In this manner, a low voltage battery coupled to the low voltage bus can receive sufficient energy during prestart to limit degradation.

While the best mode for carrying out the invention has been described in detail, those familiar with the art to which this invention relates will recognize various alternative designs and embodiments, and equivalents thereof, for practicing the invention as defined by the following claims.

The invention claimed is:

1. A method for operating a hybrid electric vehicle (HEV) having a low voltage bus, a high voltage bus, and a DC convertor electrically coupling the low and high voltage busses, the method comprising:
controllably transferring energy from the high voltage bus to the low voltage bus during prestart of the high voltage bus by controlling energy flow through the DC/DC converter.

2. The method of claim 1 further comprising determining a battery energy level of a high voltage battery coupled to the high voltage bus, the high voltage battery for storing electric energy for use in precharging the high voltage bus, controllably transferring energy to the low voltage bus from the energy provided to the high voltage bus by the high voltage battery if the battery energy level is greater than a predefined energy level.

3. The method of claim 2 further comprising determining a battery state of charge for the high voltage battery, the battery energy equaling the battery state of charge.

4. The method of claim 3 further comprising determining a battery power discharge limit for the high voltage battery, the battery energy equaling the battery power discharge limit.

5. The method of claim 2 further comprising determining whether the high voltage battery energy is sufficient for powering an electric starter used for starting the vehicle, transferring energy to the low voltage bus only if the high voltage battery energy is sufficient for power the electric starter.

6. The method of claim 5 further comprising continuously monitoring the battery energy, preventing further transfer of energy to the low voltage bus if the battery energy drops below a predefined energy threshold, the predefined threshold being greater than the energy needed for starting the electric starter.

7. The method of claim 2 further comprising determining precharging by sensing an ignition key turned to a run position, determining prestart by closing opened contactors coupled between the high voltage battery and the high voltage bus once the high voltage bus is charged, and transferring energy to the low voltage bus only if the contactors are closed.

8. The method of claim 1 further comprising determining a battery voltage of a low voltage battery coupled to the low voltage bus, controllably transferring energy to the low voltage bus based on the battery voltage of the low voltage battery.

9. The method of claim 8 further comprising limiting energy transfer to the low voltage bus if the battery voltage of the low voltage battery is greater than a predefined voltage.

10. A vehicle system controller for operating a hybrid electric vehicle (HEV) having a low voltage bus for providing power to accessory loads and a high voltage bus electrically coupled to the low voltage bus by a DC/DC converter, the high voltage bus providing power for electric driving of the vehicle, the controller comprising:
means for controllably transferring energy from the high voltage bus to the low voltage bus during prestart of the high voltage bus by controlling energy flow through the DC/DC converter.

11. The controller of claim 10 wherein the controller further comprises means for determining a battery energy level of a high voltage battery coupled to the high voltage bus and controllably transferring energy to the low voltage bus from the energy provided to the high voltage bus by the high voltage battery if the battery energy level is greater than a predefined energy level.

12. The controller of claim 11 wherein the controller further comprises means for determining a battery state of charge for the high voltage battery, the battery energy level equaling the battery state of charge.

13. The controller of claim 11 wherein the controller further comprises means for determining a battery power discharge limit for the high voltage battery, the battery energy level equaling the battery power discharge limit.

14. The controller of claim 11 wherein the controller further comprises means for determining whether the battery energy is sufficient for powering an electric starter used for starting the vehicle and transferring energy to the low voltage bus only if the battery energy level is sufficient to power a electric starter.

15. The controller of claim 14 wherein the controller further comprises means for continuously monitoring the battery energy and preventing further transfer of energy to the low voltage bus if the battery energy drops below a predefined energy threshold.

16. The controller of claim 11 wherein the controller further comprises means for determining prestart by sensing closing of opened contactors coupled between the high voltage battery and the high voltage bus once the high voltage bus is charged and transferring energy to the low voltage bus only if the contactors are closed.

17. The controller of claim 10 wherein the controller further comprises means for determining a battery voltage of a low voltage battery coupled to the low voltage bus and controllably transferring energy to the low voltage bus based on the battery voltage of the low voltage battery.

18. The controller of claim 17 wherein the controller further comprises means for limiting energy transfer to the low voltage bus if the battery voltage of the low voltage battery is greater than a predefined voltage.

19. A hybrid electric vehicle system, the system comprising:
an internal combustion engine;
a generator/motor for electrically starting the internal combustion engine;
a high voltage battery for storing high voltage energy;
a high voltage bus coupled between the generator/motor and the high voltage battery;
contactors coupled between the high voltage battery and the high voltage bus to electrically isolate the high voltage battery from the high voltage bus when opened;
a precharging device for precharging the high voltage bus prior to closing of the opened contactors;
a low voltage battery for storing low voltage energy and powering accessories;
a low voltage bus coupled between the battery and the accessories;
a DC/DC converter coupled between the high voltage bus and the low voltage bus, the DC/DC converter being isolated from the high voltage battery when the contactors are opened; and
a vehicle system controller, the vehicle system controller including instructions for controllably transferring energy from the high voltage bus to the low voltage bus during prestart of the high voltage bus by controlling energy flow through the DC/DC converter.

20. The system of claim 19 wherein the vehicle system controller further comprises instructions for transferring energy to the low voltage bus only if a high voltage battery energy is sufficient for powering the generator/motor for starting the engine.

21. The method of claim 1 further comprising performing the prestart after precharging the high voltage bus, the precharging characterized discharging a high voltage energy storage source to the high voltage bus prior to closing contactors used to electrically connect the high voltage energy storage source to an electrically operable drive element used to drive the vehicle, wherein the prestart and transferring energy from the high voltage bus to the low voltage bus occurs only after precharing is completed.

22. The method of claim 21 further comprising operating a precharging device to precharge the high voltage bus prior to closing the contactors.

* * * * *